United States Patent [19]

McGuire

[11] Patent Number: 4,881,665

[45] Date of Patent: Nov. 21, 1989

[54] SUSPENDED FLEXIBLE MEMBRANE STORAGE SILO AND ARTICLE DISPENSER

[76] Inventor: Michael L. McGuire, 1102 Wild Orchid Dr., Fallston, Md. 21047

[21] Appl. No.: 171,785

[22] Filed: Mar. 22, 1988

[51] Int. Cl.$^4$ ............................................. B67D 5/06
[52] U.S. Cl. ..................................... 222/181; 198/533; 198/525; 222/196; 222/233; 222/564; 52/197; 414/294; 366/153
[58] Field of Search ................. 414/293, 294; 221/200, 221/204; 198/533, 525; 222/191, 197, 200, 202, 203, 233, 235, 226, 547, 564; 52/197; 366/153

[56] References Cited

U.S. PATENT DOCUMENTS

| | | |
|---|---|---|
| 1,775,656 | 9/1930 | Riff . |
| 2,232,439 | 2/1941 | Connor . |
| 2,560,480 | 7/1951 | Rogers et al. . |
| 2,632,588 | 3/1953 | Hoaf ................................ 221/200 |
| 2,685,986 | 8/1954 | Hampton . |
| 2,722,171 | 11/1955 | Deringer . |
| 3,179,302 | 4/1965 | Murray ............................ 222/233 |
| 3,473,272 | 10/1969 | Hasselquist . |
| 3,762,108 | 10/1973 | Pierson . |
| 3,835,603 | 9/1974 | Schnebel . |
| 3,874,641 | 4/1975 | Tolan . |
| 3,880,300 | 4/1975 | Uhl . |
| 3,987,592 | 10/1976 | Herminghaus et al. . |
| 4,085,866 | 4/1978 | Fekl ................................ 222/158 |
| 4,127,970 | 12/1978 | Reichert .......................... 52/63 |
| 4,273,266 | 6/1981 | Snape .............................. 222/203 |
| 4,362,033 | 12/1982 | Young ............................. 366/153 |
| 4,480,766 | 11/1984 | Platt ................................. 222/181 |
| 4,625,478 | 12/1986 | Goode . |

FOREIGN PATENT DOCUMENTS

1211186  2/1986  U.S.S.R. ........................... 414/293

Primary Examiner—H. Grant Skaggs
Attorney, Agent, or Firm—Maurice U. Cahn

[57] ABSTRACT

Provided is a bulk storage silo defined by a frame and having a flexible fabric liner, internal load distribution control, vibratory discharge and helicopter-type content spreaders.

24 Claims, 3 Drawing Sheets

SUSPENDED FLEXIBLE MEMBRANE STORAGE SILO AND ARTICLE DISPENSER

TECHNICAL FIELD

This invention relates to improvements in article storage and dispensing silos for containers and, more particularly, to a flexible membrane storage silo adapted for storage and dispensing of empty product containers before filling.

BACKGROUND OF THE INVENTION

It is readily appreciated even to the unskilled artisan that a significant contribution to the cost of a retail product packaged in plastic bottles and the like, is the cost of transporting empty bottles to the product filling site. Irrespective of sanitation considerations, especially important when the bottles will be used for food products, movement of large numbers of such containers is labor intensive and energy inefficient. Little choice was given to the product manufacturer, in the past, due to the prohibitive cost of on-site manufacture of the containers. Economics did not justify the purchase and maintenance of molding equipment.

Recently, the advent of and improvements in computer-controlled molding equipment coupled with a significant cost and scale reduction, have rendered installation and maintenance of on-site container manufacturing feasible. These developments have increased the desirability for manufacturers of large quantities of commodity products, such as food, personal hygiene products, fluids for such varied uses including cleaning, auto care, etc., to provide plastic container, on-site manufacturing facilities.

Although solving the transportation cost problem, on-site production of the product containers introduces several areas for concern to the product manufacturer. More particularly, the manufacturer is faced with considerations of, among other things, adequate inventory, storage, sanitation and product damage. The prospect of the container molding equipments breaking down, without sufficient inventory, could lead to unnecessary interruption of the product output from the factory. Accordingly, it is desirable for the manufacturer to maintain an inventory of containers on site which can be employed in the event of such interrupted container production activity.

Another problem faced in on-site storage of containers is aging of the containers. It is obvious that the first-filled containers should be the first manufactured in time (first in - first out). The quality of containers can deteriorate over time. Hence, proper cycling of the container inventory is imperative to avoid accumulation of older containers. Cycling is especially important in certain businesses such as the food industry where it is undesirable to have containers stored for prolonged periods because contaminants, pests and other environmental factors may render the containers unsanitary thereby requiring disposal rather than use.

A further economic consideration is container damage. Where a plastic container remains on the bottom of a pile, not only does it age, but also the combined weight and pressure created by the overlying containers, can damage, distort, and otherwise render the lower containers unmerchantable.

Ever mindful of costs, the manufacturer with on-site container production apparatus must also factor in labor costs associated with production machinery, intra-plant container transport and introduction of the empty containers to the container filling product line. For example, where static bins are used for container storage, substantial labor is necessary to fill, track, cycle, unload and properly effect container transfer to product filling production lines. In proper practice, inventory control requires tracking of containers, especially in the food or pharmaceutical industries. Tracking consumes substantial labor. For example, if once daily, 450 containers having a capacity of one Gaylord (a standard measurement in the industry corresponding to a container measuring approximately 64 cubic feet ($4\times4\times4$)) are properly tracked, two computer entries are made for each move (start and finish) and each entry takes one second, the time dedicated solely to tracking will exceed 10 man hours per month including remedying tracking errors. It is readily appreciated that bulk storage, one input-/one output, would amount to considerable labor and cost savings.

Contemplating the foregoing with the advent of on-site container production and the intent of avoiding certain of the aforementioned problems, continuous-feed and cycle storage silos for plastic product containers have come into vogue. Commonly, these bulk storage units feature hard, inflexible walls and are associated with automatic conveying means from the unit to the production line. In practice, the hard-walled units have experienced limited acceptance due to their inflexible adaptability and the considerable manufacturing, construction and labor costs. Essentially, once installed, it is expensive and difficult to modify a hard-walled unit in order to adapt to changing requirements of the manufacturer.

Recognizing the limitations of hard-walled units, certain soft-walled product container storage silos have been introduced to the market. The advantages of such units include reduced installation expenses of up to 40%, and comparable strength, and greater adaptability and flexibility in use. The soft-walled units generally contain a fabric/polymeric liner suspended from a steel frame having an open top and a conveyor means disposed along the bottom to transport empty containers to the production line. Although soft-walled units are usually satisfactory for their intended purpose, several shortcomings in their use are identifiable.

For example, unless the fabric liner is properly mounted to the frame, it can warp and cause significant product stacking leading to damaging weight concentration on bottom-most containers. Furthermore, where a weak fabric liner is employed, concentrated excess loading may cause damage to the liner, itself. It is also known that discharge jamming occurs. Empty plastic containers stored in soft-walled silos can lodge in and block the container conveyor exit or chute whereupon it is necessary for a workman to clear the product chute either by climbing into the storage silo or accessing the exit chute under the silo.

The final problem noted here, is article distribution within the storage silo. Uneven distribution of product containers in the storage silo will result in a failure to utilize the available storage volume. It is readily apparent that empty containers fed into the silo by a conveyor linked to the blow-molding apparatus will form a pile bearing the likeness of a conical pyramid from the point of exit from the conveyor. Pyramiding not only leads to unutilized space in the storage silo, itself, but also, especially in the context of the plastic/fabric wall, can create selected points of excess loading thereby causing damage to the lower-most containers. Moreover, the uneven distribution of containers in the silo near its discharge can induce jamming.

SUMMARY OF THE INVENTION

It is an object of the invention to overcome the aforementioned problems and shortcomings in the prior art.

It is another object of this invention to provide a relatively easily installed, readily tailorable, and inexpensive container bulk storage silo.

It is still another object of this invention to provide an easily modifiable storage bin for product containers to meet specific needs of the particular user.

Still another object of this invention is to provide a storage bin for articles which assists to distribute the article load within the container over the entire crosssection of the silo.

Yet another object of this invention is to provide a storage silo incorporating means to insure non-damaging, uniform product distribution within the silo.

Still another object of this invention is to provide a storage bin for articles which is composed of a tear-resistant suspended flexible membrane.

Another object of this invention is to provide a bulk storage silo for product containers which includes an anti-jamming device associated with the container discharge.

These and other objects are overcome by the invention providing a bulk storage silo for articles, comprising:

a rigid frame of a desired configuration and dimensions including vertical members having a top and a bottom and horizontal members extending between and interconnecting said vertical members, said horizontal members defining an upper horizontal supports and medial horizontal supports, said upper supports being located proximate to the top of said vertical members and extending around the upper periphery thereof and said medial supports extending around the periphery between the upper supports and the bottom of said vertical members, a flexible member for attachment to and suspension within said frame fashioned from at least one sheet-like membrane, said flexible member being composed of a tear-resistant reinforced grid of interconnected strands embedded in a synthetic resin, said flexible member defining side walls extending between said upper supports and said medial supports and an inverted frustum configured bottom converging within the frame between said medial supports and the bottom of said vertical members at a fixed elevation above the bottom, connecting means for connecting said flexible member to both said upper and lower supports, a discharge duct located at the frustum of said flexible member, and vibrating means vibrationally associated with said discharge duct and to said flexible member for inducing vibration of a selected amplitude and frequency in said flexible member proximate to said discharge duct, where articles are introduced over top of said frame and into the space defined by the flexible member and urged through the discharge duct by said vibratory means.

The invention also satisfies the foregoing and other objects by providing a bulk storage silo for article storage, featuring:

(a) a frame, (b) a flexible fabric member composed of one or more flexible sheets, said member to define side walls and a bottom of, (c) connecting means for connecting said fabric member to said frame, (d) a discharge opening located in the flexible member on the bottom for gravity-assisted discharge of articles, (e) vibratory means operatively associated with said flexible member proximate to said discharge opening for vibrating said flexible member to promote uniform discharge of articles from said silo, and (f) load distribution and support means connected to and extending across the crosssection of said frame in a horizontal plane above said discharge member to promote uniform distribution of articles contained by said flexible member.

While the foregoing discussion has been generally limited to the container storage and transport discipline, it should be apparent to the skilled artisan that this invention is readily adaptable for use in many bulk storage applications given the following description of the drawings.

DETAILED DESCRIPTION OF THE ILLUSTRATED EMBODIMENT

Figure 1:
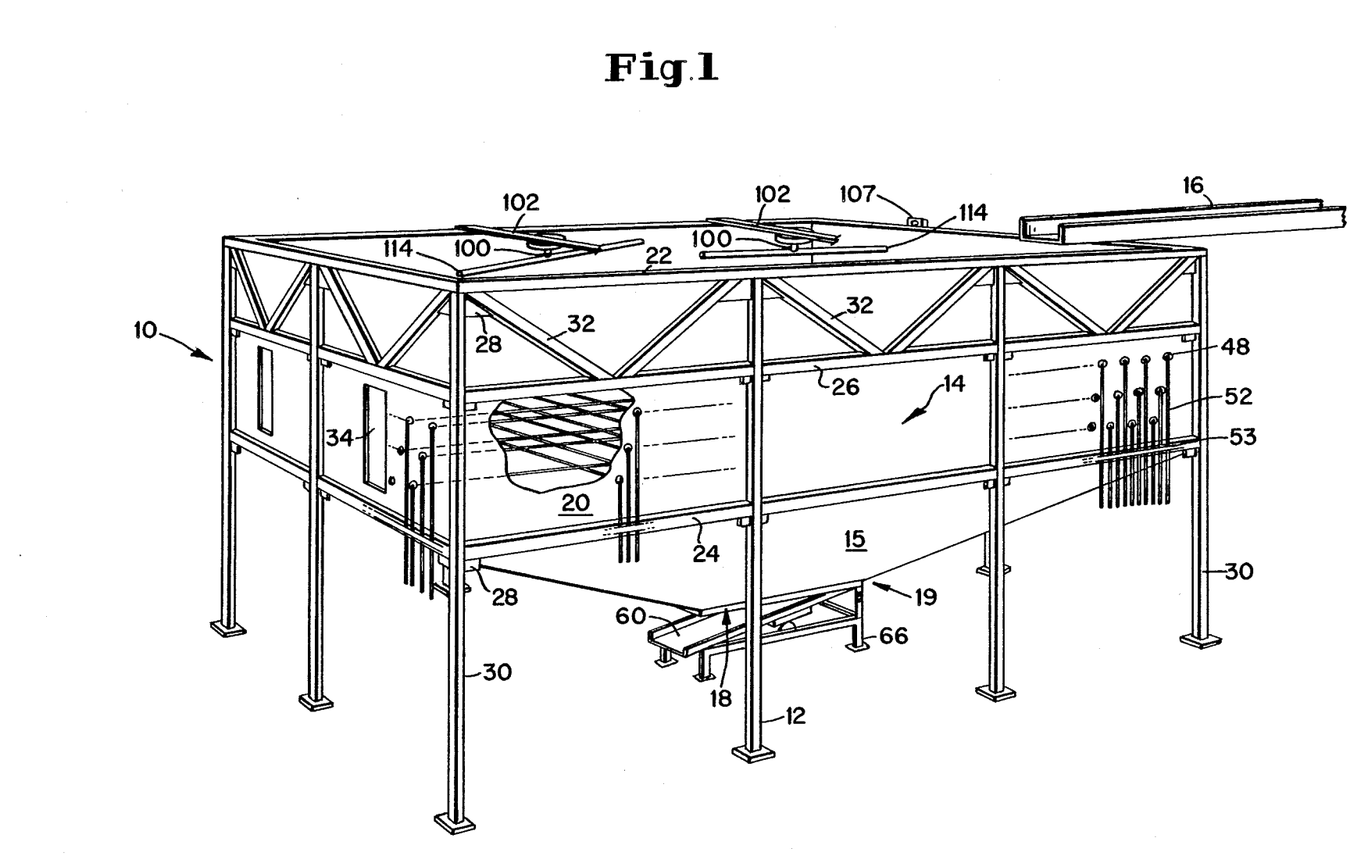
FIG. 1 is a perspective view of the invention.

Basically, bulk storage hopper or silo 10 is composed primarily of a steel tube frame 12 and a flexible fabric liner 14 in two principal sections, sidewalls 20 and converging bottom 15. The geometric arrangement of frame 12 and liner 14 govern the particular configuration and size of silo 10. Appropriately located proximate to the upper area of silo 10 is input conveyor 16 which charges the silo with the particular containers or articles to be stored. Medially disposed across silo 10 is load redistribution web 52. At the lower central portion is discharge opening 18, operatively vibrated by vibrator system 60 which feeds the stored articles to discharge system 19. Finally, helicopter spreaders 100 are positioned near the top of silo 10.

Silo 10 features steel tubing frame 12, an open top and fabric sidewalls 20 and inverted pyramidally configured bottom 15. Frame 12 includes vertical corner support posts 30 interconnected by upper crossmembers 22, intermediate crossmembers 26 and lower crossmembers 24. Posts 30 and crossmembers 22, 26 and 24 are attached by welding or reinforcing assembly 28. Assembly 28 comprises one-inch steel plating bolts and nuts. Sidewalls 20 are attached to frame 12 along upper crossmembers 22 and lower crossmembers 24. Disposed along vertical support posts 30 and intermediate to upper crossmembers 22 and lower crossmembers 24 are intermediate crossmembers 26 generally parallelly aligned with the upper and lower crossmembers and similarly attached to vertical support posts 30. For purposes of structural integrity and strength, struts 32 are welded and otherwise appropriately secured to and triangularly extend from upper crossmembers 22 to intermediate crossmembers 26.

Liner 14, preferably, is a tough, flexible membrane liner composed of resin impregnated woven fibers. It has been determined that geomembrane-type liners are eminently suited for use in this invention. More particularly, the 8130 and 8430 fabric products available from Seaman Corporation of Millersburg, Ohio, are identified as such materials. It is a Dacron ® polyester woven fabric (170–225 g/m²) primed and coated with Dupont ELVALOY ® polymeric resin. The flexible 8130 and 8430 fabric has a tensile strength (ASTM D-751) and puncture resistant (FT MS 101B-method 2031) of 159–216 kg and 136–159 kg, respectively, while being relatively lightweight (1020 g/m²). In practice, it is preferred that the fabric be slippery (exhibit minimal frictional resistance) and, therefore, the fabric should be polished before installation. Although the time-proven deterioration resistance, strength and effectiveness of the 8130 and 8430 fabric makes its use desirable, other appropriate flexible fabric material exhibiting good physical properties, can be used.

Figure 2:
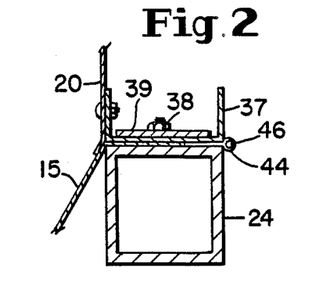
FIG. 2 is a cutaway side view of the attachment configuration for the liner.
Figure 3:
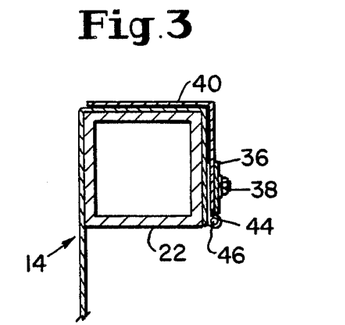
FIG. 3 is a cutaway side view of the upper peripheral attachment configuration for the liner.

The connection system of liner 14 to frame 12 is depicted in FIGS. 2 and 3. The separate fabric segments composing bottom 15 include edging which features a reinforced overlapped folded edge portion 44. The fabric is overlapped in a manner to envelop ⅜" rope reinforcement member 46. Spaced holes (18 inches) are provided along edge portion 44 to be complementary to and be secured on ⅜" threaded metal studs 38 projecting from lower crossmember 24. Once seated over studs 38, U-bar 37, having spaced holes corresponding to the spacing of studs 38, is placed over reinforced liner edges 44 and studs 38. Fender washer 39 is placed over U-bar 37 and the combination is secured to stud 38 by nuts or other appropriate means. Sidewalls 20 are then attached to the interior leg of U-bar 37 with ⅜" carriage bolts. Appropriately spaced holes (not illustrated) are provided in sidewalls 20 to achieve the interconnection. To ensure a substantially smooth continuous interior surface, sidewalls 20 are of a length sufficient to overlie the junction of bottom 15 and crossmember 24.

Sidewalls 20 of liner 14 are secured to the top of silo 10 with a stud/flat bar 36 arrangement to upper crossmembers 22 around the entire periphery of silo 10 (see FIG. 3). Optionally, for purposes of minimizing wear and damage to the upper peripheral edge of the liner, protective cap 40 having an L-shaped crosssection and holes corresponding to the position of studs 3 along upper crossmember 22 is placed between flat bar 36 and liner edge 44. Protective cap 40 is dimensioned to cover and protect the exposed portion of liner 14 extending over the upper edges of crossmember 22.

It should be noted, at this point, that in the construction of larger silos (at least 450 Gaylords), sidewalls 20 and bottom 15 will be composed from several different pieces of fabric. Heat welding of the joints between the individual pieces to form an integrated sheet is urged since mere stitching may not provide adequate strength once silo 10 is loaded. The existence of a weak joint may cause separation of the individual sheet components and not only require substantial repair but also considerable cleanup efforts.

Moving now to the internal load redistribution structure of silo 10, sidewalls 20 include reinforced grommets 48 positioned at regularly spaced intervals. Grommets 48 are arranged to pass the individual nylon or canvas strands comprising webbing or grid 52 from the interior to the exterior of silo 10. In this manner, grid member 52 extends across the entire planar crosssection of silo 10 and provides load redistribution. By assisting to distribute the load within silo 10, grid 52 prevents damage to stored articles, such as plastic bottles, caused by concentration of too much weight on one point. Furthermore, the risk of damage to liner 14 from overloading at one point is minimized. Grid 5 also serves to promote uniform discharge of articles stored in silo 10 through discharge 18 by reducing potential jamming caused by weight concentration.

Gridded member 52 can be secured to sidewalls 20 through grommets 48 by the simple expedient of tied knots. Preferably, however, the tension of the gridded member or webbing 52 within the silo is adjustable. Adjustability may be accomplished by appropriate, conventional means such as friction gripping buckles 53, similar to those used for aircraft seat belts, secured to the exterior side of lower crossmember 24. One strap end is received and secured by one buckle. Buckles 53 are disposed around the periphery of crossmembers 24 to allow for tensioning of grid 52 as desired. In this manner, tensioned webbing 52 will provide for substantially stable load distribution within silo 10 or if individual strands are suddenly pulled, will allow for rearrangement of the load.

A final feature of the upper silo portion is the presence of viewports 34. Viewports 34, generally composed of strong, rigid clear polymeric material such as "Lexan" (polycarbonate) are heat-sealed or bolted into the appropriately sized apertures in sidewalls 20. Viewports 34 extend between intermediate crossmembers 26 and lower crossmembers 24 thereby providing the user with instantaneous visual access to the interior of the silo for purposes of inspection, maintenance, inventory control, etc., without need for accessing silo 10 from above.

Referring now to the lower silo structure, converging liner portion 15 and discharge 18, as will become clear below, are positioned to communicate articles stored in silo 10 to associated underlying conveyor apparatus. Discharge chute 18 comprises a generally rectangular opening at the lower-most area of silo 10. Discharge opening 18 is appropriately sized to promote continuous discharge of articles stored in silo 10. Discharge 18 need not possess any edging reinforcement or specialized features. In essence, it is merely an opening in the bottom of liner 14 lying in a plane substantially parallel to the top of silo 10. Optionally, discharge 18 may feature a flap which closes the bottom.

Figure 4:
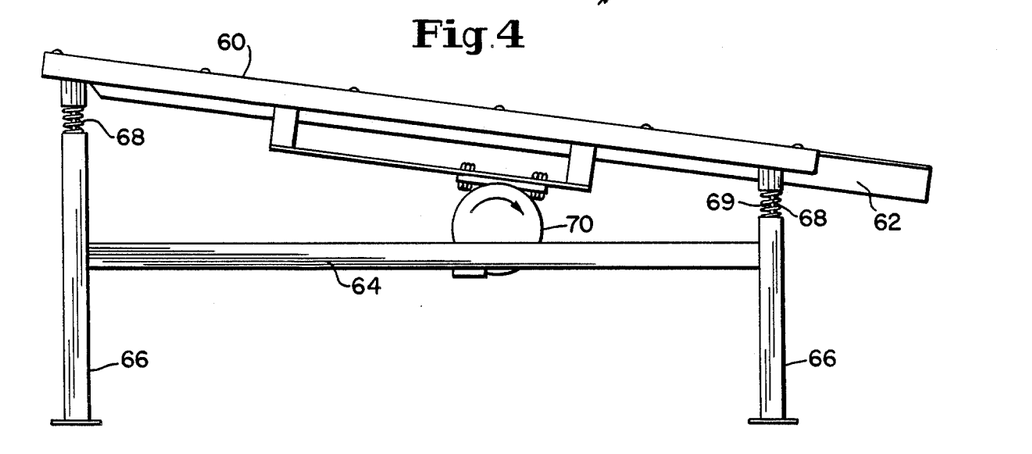
FIG. 4 is a side view of the discharge oscillatory apparatus.
Figure 5:
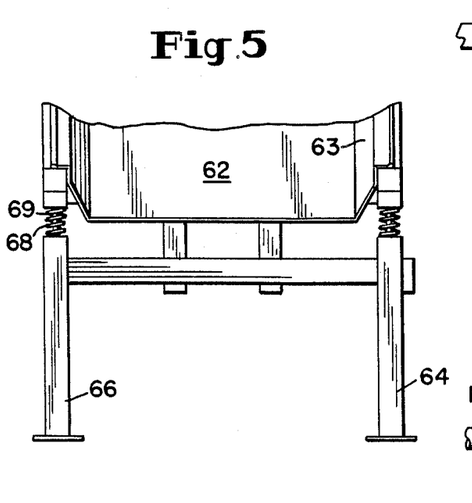
FIG. 5 is a sectional front view of the discharge vibratory apparatus.

To induce movement of articles through discharge 18, it is associated with a mechanical vibratory system 60 composed from steel, aluminum or appropriate engineering plastics which includes inclined, channeled vibrating plate 62. The upper edge of plate 62 is positioned to underlie and abut one side of discharge 18. Since vibratory plate 62 is inclined, it should be readily appreciated that only a portion of the liner edges will lie on the plate peripheral to its uppermost portion. By this arrangement, articles exiting the silo through discharge chute 18 are urged by gravity out of the chute and along plate 62. Plate sidewalls 63, projecting above plate 62, provide a channel to direct the discharged articles down the incline to the product line conveyor (described below). A further observation of the discharge chute vibrator arrangement is the fact that the chute is generally open and that the vibratory energy of plate 62 is primarily transferred to and through the articles lying on the plate.

The structural details of vibratory system 60 are now briefly described. Plate 62 and sidewalls 63 provide a channeled, inclined contact surface which is mounted on spring suspension frame 64. Mounted on the underside of plate 62 is vibrator 70, preferably electrically powered. Such vibrators are commercially available as, for example, the Model RC 54-4 Rotary Electric Vibrator from Cleveland Vibrator Company of Cleveland, Ohio. In one embodiment, an 1800 RPM electric vibrator capable of generating an approximately 2000 lb. force has been successfully employed.

Frame 64 is placed on a suitable concrete platform or base. Frame 64 includes four vertical posts 66 for connection to plate 62. In order to provide a stabilized base for vibratory plate 62, a spring suspension connection 68 or the like is employed. As illustrated in FIGS. 4 and 5, adjustable coil spring mounts 69 are employed. Alternatively, posts 66 may comprise telescoping square steel tubing with coacting hole/pin height adjustment and supplemental screw adjustment (corresponding to mounts 69).

Figure 6:
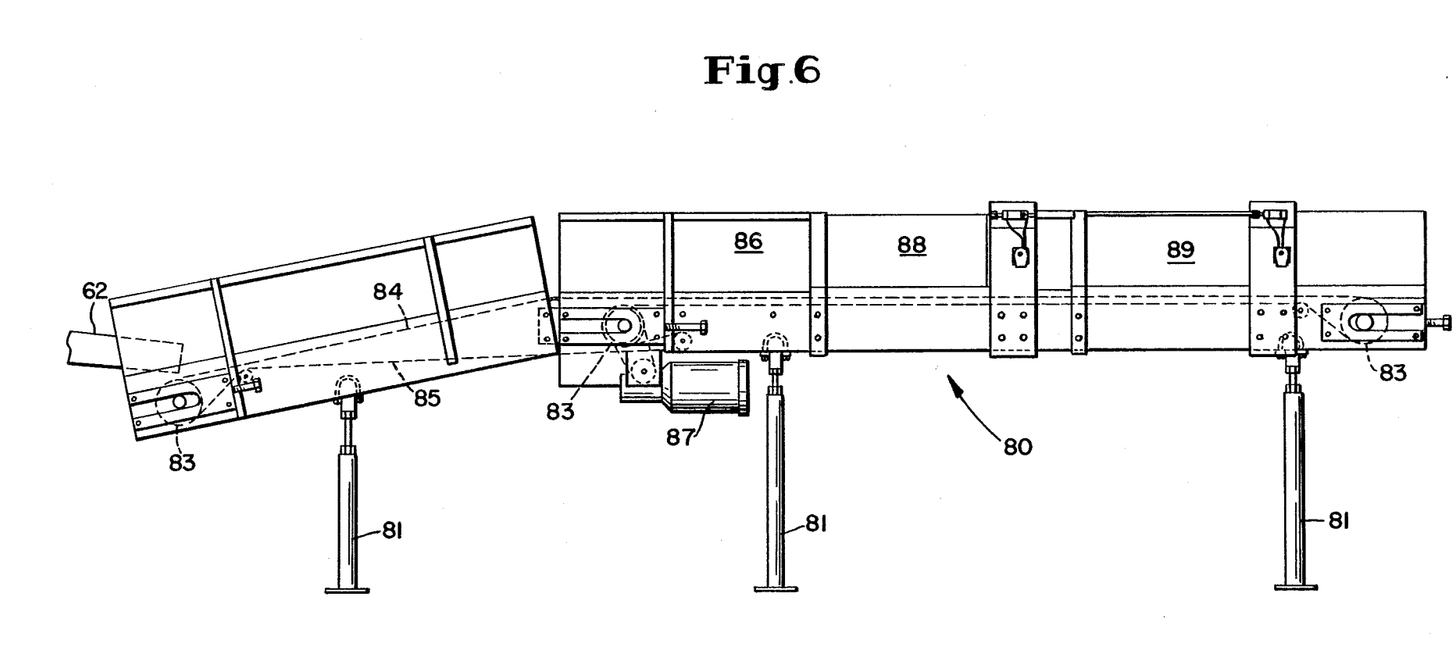
FIG. 6 is a cutaway side view of the discharge conveyor.

Moving now to FIG. 6, product line conveyor system 80 features height adjustable support posts 81, a channel 82 defined by conveyor floor 84 and sidewalls 86, a drive means and exit gates 88 and 89. Conveyor floor 84 features an endless belt-type conveyor 85 which is powered through sprockets 83 by drive motor 87 appropriately attached to the underside of the system. System 80 is articulated to provide angular adjustment relative to the junction with the end of plate 62 and defines a continuous channel from discharge 18. The arrangement allows articles sliding down plate 62 to engage conveyor 85 for transport to exit gates 88 and 89. Exit gates 88 and 89 can be remotely controlled to open and close in order to deposit articles from channel 82 onto a conventional product line conveyor underlying the Article discharge now having been discussed, introducing articles to silo 10 is now described. Articles are moved from their source, either a truck, storage means or molding machine by conventional conveyor 16. To maximize loading capacity, the charging conveyor exit is positioned above silo 10. Without additional features, articles would fall into silo 10 and be marginally dispersed by grid 52. Those articles, however, would tend to pyramid causing a loss of effective storage capacity. Hence, an article spreader is employed to overcome this problem.

Figure 7:
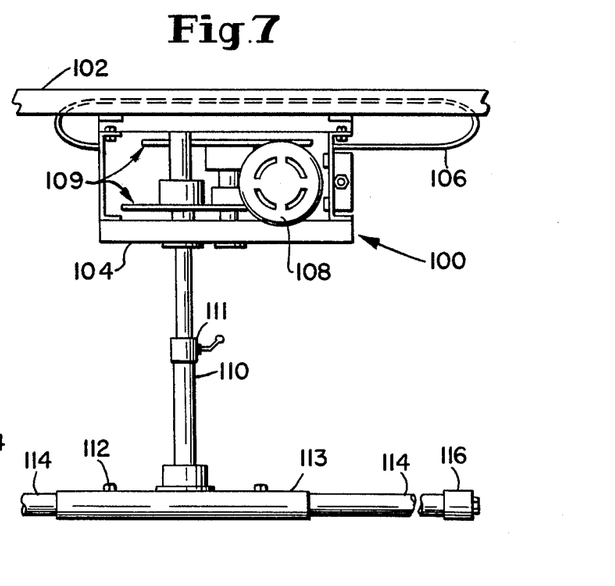
FIG. 7 is a cutaway side view of the helicopter spreader.

Referring now to the upper portion of silo 10, helicopter spreader 100, featured in detail in FIG. 7, is mounted on track 102 which is suspended or supported by appropriate means above silo 10. Spreader 100 contains ⅛ horsepower electric motor 108. Drive gearing 109 attached to and associated with motor 108 is designed to reduce the number of revolutions of motor 108 to shaft 110. Conventional speed reduction gearing is suitable to achieve rotation of shaft 110 in a range of 0.25-3 revolutions per minute. At the opposite end of shaft 110 is T-connector 112 which is screwed or otherwise appropriately secured to support horizontally projecting plastic tube spreader vanes 114. Vanes 114 are interchangeable and screwed into cooperating tubular hubs 113 of connector 112. Vanes 114 feature interchangeable and adjustable counter weights 116 at their respective ends to maintain vane 114 in the proper position relative to silo 10 and achieve effective article spreading through controlled, non-damaging, rotation. Depending on the nature of the articles being stored in silo 10, the particular characteristics of vanes 114 and speed of rotation of shaft 110 may be modified. Caution must be exercised to avoid modification of vanes 114 which would cause damage to the articles. Furthermore, the selection of the material of vanes 114 must be governed by considerations of non-damaging composition. In other words, it is important that the vanes be composed from a material which possesses an equivalent or lesser hardness than the articles in the container (especially in the case of soft polymeric containers) in order to avoid scoring by the rotating vanes.

Helicopter spreader 100 is mounted to translate across silo 10. Depending on the particular requirements, track 102 is suspended lengthwise or widthwise above silo 10. Tracks 102 are formed of a strong, rigid material, preferably tubular steel and include a coextensive channel to coact with the mounting elements of spreader 100. Such steel tubing is commercially available as for example from Midland-Ross Corp. sold under the name, SUPER-STRUT® (C and E Series) with cooperating frictionless needle bearing trolley fittings (TR 292, TR 294). Spreader 100 is attached to track 201 by trolleys, etc., adapted to coact and translate along track 102. For ease of translating spreader 100 relative to track 102, given the considerable size of silo 10, handline 106 is provided. Handline 106 extends along the entire track length to pulleys, one each positioned at the ends of track 102. An operator merely needs to pull on the handline for repositioning or to retrieve spreader 100 for maintenance. It is elementary that a motorized translating means can be substituted for handline 106. Height adjustability of helicopter spreaders 100 is achieved by providing shaft 110 with a telescoping feature. A typical frictional spin coupling collar can be used to permit height adjustment and securing shaft 110 at a desired length. As with hand lines, conventional mechanical actuating means can be employed to render remote height adjustment.

The most effective arrangement for use of spreader 100 is to provide electric eye controller 107 mounted on the top of frame 12 for actuation of motors 108. When the pile of charged articles reaches a specified height and breaks the light beam emitted from eye controller 107, spreader 100 is actuated to disperse the pile within silo 10. Alternatively, controller 107 may be mounted to spreader shaft 110. Such electric eye controllers are commercially available and so well known that there is no need to describe their particular structure.

For purposes of efficiency, particularly in the case of a large, rectangular silo, it has been found that two helicopter spreaders 100 spaced apart above silo 10 provide more effective article distribution than use of one spreader. With two spreaders 100, the necessary rotational force to move the stored articles is minimized, thereby avoiding unnecessary damage. Furthermore, two spreaders provide the user with a greater degree of flexibility, where, for example, the user may select the height of each spreader by loosening tightening clamp 111 on telescoping shaft 110, to control the height of the silo content at similar or different levels.

A final discussed variation of helicopter spreader 100 is that the configuration vanes 114 may be modified. In certain instances, it may be desirable to include downwardly or angled projecting baffles to promote spreading efficiencies. Where smaller articles or containers are to be stored in silo 10, vanes 114 may be constructed to possess a comb-shape configuration. In essence, the skilled artisan may select the appropriate configuration for vanes 114 contingent on the intended use of silo 10.

Given the foregoing description, modifications and variations of the bulk storage silo of this invention should be readily apparent to the skilled artisan. Accordingly, such modifications and variations are intended to fall within the intent and scope of the invention as defined by the following claims.

I claim:

1. A bulk storage silo for damageable articles, comprising:

a rigid frame of a desired configuration and dimensions including vertical members having a top and a bottom and horizontal members extending between and interconnecting said vertical members, said horizontal members defining upper horizontal supports and medial horizontal supports, said upper supports being located proximate to the top of said vertical members and extending around the upper periphery thereof and said medial supports extending around the periphery between the upper supports and the bottom of said vertical members, a flexible member for attachment to and suspension within said frame fashioned from at least one sheet-like membrane, said flexible member being composed of a tear-resistant reinforced grid of interconnected strands embedded in a synthetic resin, said flexible member defining side walls extending between said upper supports and said medial supports and an inverted frustum configured bottom converging within the frame between said medial supports and the bottom of said vertical members at a fixed elevation above the bottom, said flexible member operative to contain articles in anondamaging manner, connecting means for connecting said flexible member to both said upper and medial supports, a discharge duct located at the frustum of said flexible member, and vibrating means isolated from said rigid frame and vibrationally associated with said discharge duct for inducing vibration of a selected amplitude and frequency and imparting the vibration to the articles contained in said flexible member proximate to said discharge duct in a manner that the articles discharge substantially uniformly from said discharge duct without imparting undue vibration to said rigid frame, where articles are stored in and discharged from the silo in a manner to preserve the integrity of the articles after being introduced over top of said frame and into the space defined by the flexible member urged through the discharge duct by said vibratory means.

2. A silo according to claim 1 further comprising a non-damaging gridded element having openings therethrough of substantially greater dimensions than the articles, said gridded element extending between and connected to said medial supports where said gridded member assists to properly distribute the articles within said flexible member in a manner where the articles will not be damaged upon contact with said gridded element.

3. A silo according to claim 2 where the gridded member is composed of a plurality of perpendicularly disposed tensionable straps.

4. A silo according to claim 3 further including adjustment means associated with each of said straps and located on said medial supports where said adjustment means permits adjustment of the straps tension.

5. A silo according to claim 1 further comprising conveying means disposed under said discharge duct for conveying articles away from said silo.

6. A silo according to claim 1 further including rotating spreading means disposed proximate to the plane defined by said upper supports.

7. A silo according to claim 6 where said spreading means includes a plurality of elongated blades connected to a rotating actuating motor and further comprising height adjusting means for adjusting the height of the spreading means relative to the plane.

8. A silo according to claim 7 where the spreading means is actuated by a sensing member which senses the height of the containers in the silo.

9. A silo according to claim 1 further comprising bar elements for connection to said upper supports and for engaging said medial supports where said flexible member is anchored to said upper supports and said medial supports with said bar elements.

10. A silo according to claim 9 where said flexible member includes reinforced edging for engagement of said bottom with said frame and bar elements.

11. A silo according to claim 1 further comprising feed through grommets and clear polymeric windows in said flexible member.

12. A bulk storage silo for damageable article storage, comprising:

(a) a frame, (b) a flexible fabric member composed of at least one flexible sheet, said member to define side walls and a bottom with a flexible opening for containing articles in a non-damaging manner, (c) connecting means for connecting said fabric member to said frame, (d) a discharge opening defined by the flexible opening on the bottom for gravity-assisted discharge of articles, (e) vibratory means isolated from said frame and operatively associated with said discharge opening for imparting vibratory force to articles contained within the fabric member to promote uniform discharge of articles from said silo, in a manner that the articles substantially uniformly discharge from said discharge opening without imparting undue vibration to said frame, and (f) article load distribution and article support means connected to and extending across the crosssection of said frame in a horizontal plane above said discharge member to promote uniform distribution of articles contained by said flexible member whereby the articles are stored in and discharged through said discharge opening in a manner to preserve the integrity of the articles.

13. A silo according to claim 12 further comprising releasable clamping means for connecting said load distribution and support means to said frame and where said load distribution and support means is flexible and tensionable strapping.

14. A silo according to claim 13 further comprising an article distribution device located above said load distribution means to promote uniform distribution of articles contained within said flexible member.

15. A silo according to claim 14 where said article distribution device features a motor and elongated vanes where said motor rotates said vanes to spread the articles.

16. A bulk storage silo for non-damaging article storage, comprising:
   a frame,
   a flexible fabric member composed of one or more flexible sheets, said member to define side walls and a bottom of said member being attached to said frame, said flexible fabric member being operative to store said articles without causing damage thereto,
   a discharge opening located in the flexible member on the bottom for gravity-assisted discharge of articles,
   vibratory means isolated from said frame to prevent undue vibration thereto and operatively associated with said discharge opening for vibrating the articles in a non-damaging manner proximate to said discharge opening,
   an article non-damaging, load distribution and support grid extending across the crosssection of said frame in a plane above said discharge opening, and
   a helicopter spreader located above said load distribution grid to promote uniform distribution of articles contained within said flexible member said helicopter spreader includes an actuable motor and elongated vanes composed of a material of equal or lesser hardness than the articles to be stored where said motor rotates said vanes at a rate which avoids damage to the articles.

17. A silo according to claim 16 where the helicopter means is actuated by an electric eye sensing member which senses the height of articles in the silo.

18. A silo according to claim 17 where said helicopter spreader includes height adjustment means for adjusting the height of the spreader relative to the silo.

19. A silo according to claim 16 further comprising feed through grommets and clear polymeric windows in said flexible member.

20. A bulk storage silo for non-damaging article storage, comprising:
   a frame having a top and a bottom,
   a flexible fabric member composed of at least one flexible sheet, said member to define side walls and a bottom of said member being attached to said frame at the top and extending proximate to the frame bottom for storage of articles in a non-compressive manner,
   a discharge opening located in the flexible member on the bottom for gravity-assisted discharge of articles,
   vibrating means isolated from said frame for imparting vibratory force to articles proximate to said discharge opening, and
   a helicopter spreader positioned proximate to the top of the frame to promote uniform distribution of articles contained within said flexible member said helicopter spreader includes an actuable motor and elongated vanes composed of a material of equivalent or lesser hardness than that of the articles where said motor rotates said vanes at a rate sufficiently small to preserve the integrity of the articles.

21. A bulk storage device for damageable articles, comprising:
   (a) frame means for defining a three-dimensional outline,
   (b) flexible means for suspending from said frame means to define a hopper contained within said frame for non-damaging storage of the articles therein, said flexible means further including a discharge duct,
   (c) connecting means for connecting said flexible means to said frame means,
   (d) load redistribution means contained within said hopper and connectable to said frame means said load redistribution means for non-damaging contact and distribution of the articles contained within the device,
   (e) vibratory discharge means for imparting article non-damaging vibration to the articles without unduly vibrating said frame means to urge the articles to discharge through said discharge duct, and
   (f) helicopter spreader means for promoting uniform distribution of articles contained in the hopper, said helicopter spreader means being rotatable at an article non-damaging rate and including elongated vanes composed of a material of equal or lesser hardness than the articles to avoid scarring the articles upon rotation.

22. Bulk storage apparatus for storing finished, damageable articles, comprising:
   a flexible hopper for non-damaging storage of the articles, a rotatable helicopter spreader, said helicopter spreader including an actuating motor, elongated vanes composed of an article non-damaging material and means for actuating said motor at an article non-damaging rate of rotation when the quantity of articles in said hopper exceeds a threshold quantity to cause said vanes to rotate where said spreader distributes articles within said hopper in a manner to preserve the integrity of the articles, and
   vibratory discharge means for uniformly discharging articles contained within said hopper in a non-damaging manner.

23. A bulk storage silo for articles, comprising:
   a rigid frame of a desired configuration and dimensions including vertical members having a top and a bottom and horizontal members extending between and interconnecting said vertical members, said horizontal members defining an upper horizontal supports and medial horizontal supports, said upper supports being located proximate to the top of said vertical members and extending around the upper periphery thereof and said medial supports extending around the periphery between the upper supports and the bottom of said vertical members,
   a flexible member for attachment to and suspension within said frame fashioned from at least one sheet-like membrane, said flexible member being composed of a tear-resistant reinforced grid of interconnected strands embedded in a synthetic resin, said flexible member defining side walls extending between said upper supports and said medial supports and an inverted frustum configured bottom converging within the frame between said medial supports and the bottom of said vertical members at a fixed elevation above the bottom, connecting means for connecting said flexible member to both said upper and medial supports, a discharge duct located at the frustum of said flexible member, vibrating means vibrationally associated with said discharge duct and to said flexible member for inducing vibration of a selected amplitude and frequency in said member proximate to said discharge duct, rotating spreading means disposed proximate to the plane defined by said upper supports where said spreading means includes a plurality of elongated blades connected to a rotating actuating motor, and height adjusting means for adjusting the height of the spreading means relative to the plane where the spreading means is actuated by a sensing member which senses the height of the containers in the silo, where articles are introduced over top of said frame and into the space defined by the flexible member and urged through the discharge duct by said vibratory means.

24. A bulk storage silo for article storage, comprising:

a frame, a flexible fabric member composed of one or more flexible sheets, said member to define side walls and a bottom of said member being attached to said frame, a discharge opening located in the flexible member on the bottom for gravity-assisted discharge of articles, vibratory means operatively associated with said flexible member proximate to said discharge opening for vibrating said flexible member, a load distribution and support grid extending across the cross section of said frame in a plane above said discharge opening, and a helicopter spreader located above said load distribution grid to promote uniform distribution of articles contained within said flexible member said helicopter spreader includes an actuable motor and elongated vanes where said motor rotates said vanes, where the helicopter means is actuated by an electric eye sensing member which senses the height of articles in the silo.

* * * * *